April 19, 1927.  N. TOGAMI  1,625,509
ELECTROMAGNETIC SWITCH
Filed April 27, 1923
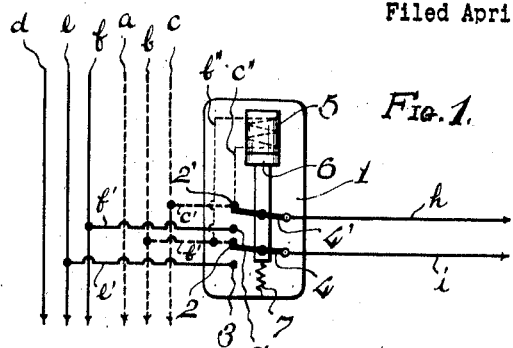
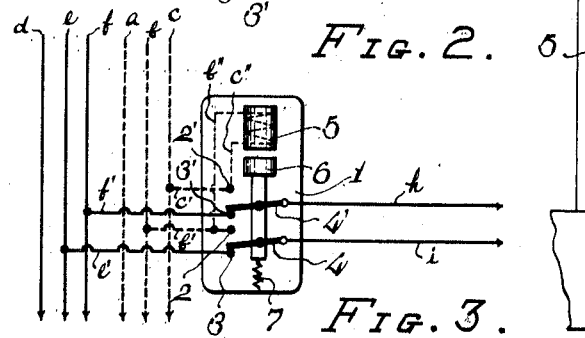
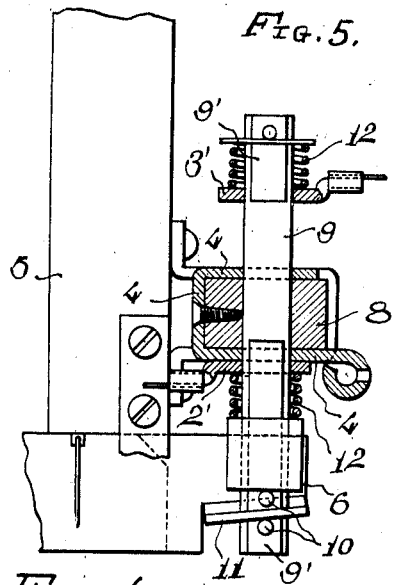
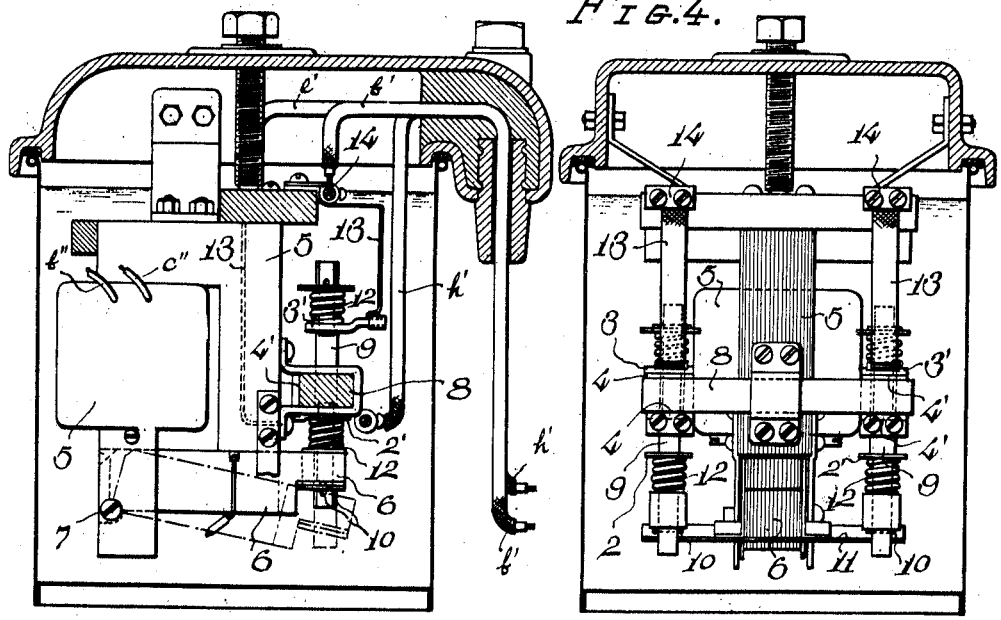
Inventor:
N. Togami Patented Apr. 19, 1927.

1,625,509

UNITED STATES PATENT OFFICE.

NOBUFUMI TOGAMI, OF SAGA, JAPAN.

ELECTROMAGNETIC SWITCH.

Application filed April 27, 1923. Serial No. 635,118.

My invention relates to improvements in automatic electric distributing apparatus embodying a special electromagnetic switch at each branching point of branch lines and has for its object to distribute electric power to the branch lines continuously day and night, from two sets of transmission lines differing from each other in the time of electric supply.
In ordinary systems of electric supply provided with two sets of transmission lines differing in the time of electric supply, as for instance day-time lines and night-time lines, where a continuous supply through day and night is required another set of continuous transmission lines, for instance day and night lines, is an indispensible necessity. The present invention dispenses with such continuous transmission lines, and electric power can be supplied to branch lines automatically day and night from two sets of transmission lines by special switches provided at each branching point. According to the present invention two sets of contact pieces, fixed or moving, are provided in said switch and are connected to the respective sets of transmission lines differing from each other in the time of electric supply, while another set of contact pieces are provided in said switch, moving or fixed corresponding to the mounting of the first sets of contact pieces, and are connected to the branch lines to which electric power is to be continuously supplied. Said moving contact pieces are mechanically related to the armature of an electro-magnet which latter is connected to one set of the transmission lines. While electric power is supplied to said set of transmission lines the branch lines are connected to the former by the action of the electro-magnet, and when electric supply to the transmission lines is reversed the branch lines are automatically connected to another set of transmission lines by the action of a spring or by the weight of the armature etc. Thus electric power is distributed to the branch lines continuously day and night from two sets of transmission lines differing from each other in the time of supply.
According to the present invention electric power can be distributed economically by saving a set of transmission lines, namely day and night lines, in comparison with those electric distributing systems hitherto in use. As the branch lines in the present apparatus are connected to one set only of transmission lines and never become connected to both sets at the same time, it is of no concern even where there is a voltage difference between two sets of transmission lines, and while electric power is supplied to one set of the transmission lines, the branch line is kept connected without fail to said set, and the connection is never reversed until electric supply to said set is stopped, so that no danger occurs even if the electric power is accidentally supplied to the other set of transmission lines at the same time.
The accompanying drawing shows an example of the distributing apparatus of the present invention. Fig. 1 is a diagrammatical view of the apparatus showing the connection of the lines. Fig. 2 is same, showing the electro-magnet in the idle state. Fig. 3 is a sectional side elevation of the switch used in the present apparatus. Fig. 4 is a sectional elevation of same. Fig. 5 is a detailed sectional side elevation of the switch on an enlarged scale showing the mounting of the contact pieces.
Referring to Figures 1 and 2 $(a)$, $(b)$, $(c)$ and $(d)$, $(e)$, $(f)$ designate two sets of transmission lines differing from each other in the time of electric supply as for instance night-time lines $(a)$, $(b)$, $(c)$ and day-time lines $(d)$, $(e)$, $(f)$. At each branching point of the branch lines $(h)$ and $(i)$, to which a continuous distribution of electric power through day and night is required, an automatic electromagnetic switch (1) is provided. Two sets of contact pieces (2) (2') and (3) (3') are fixed in the reversing switch (1). One set of said contact pieces (2) and (2') are connected to the night-time lines $(b)$ and $(c)$ by leading wires $(b')$ and $(c')$, and the other set (3) and (3') are connected to the day-time lines $(e)$ and $(f)$ by leading wires $(e')$ and $(f')$. Another set of contact pieces (4) and (4'), corresponding to aforesaid sets of contact pieces, is movably arranged in the electromagnetic switch (1), and said set is directly connected to the branch lines $(h)$ and $(i)$. The electromagnetic switch is also provided with an electro-magnet (5) the coil of which is connected to a set of the transmission lines, for instance night-time lines (*b*) and (*c*) by leading wires (*b″*) and (*c″*). The armature (6) of the electro-magnet (5), is made to be attracted downwards, when the electro-magnet is deenergized, by the tension of the spring (7) attached at its lower end, or in case said spring is not provided by the weight of the armature itself, and one end of the armature is linked to the moving contact pieces (4) (4′), as shown.

While electric power is supplied to the night-time lines (*a*), (*b*) and (*c*), the electro-magnet (5) in the electromagnetic switch (1) attracts the armature (6) and the moving contact pieces (4) and (4′) come in contact with one set of the fixed contact pieces (2) (2′), so that the branch lines (*h*) and (*i*) are connected to one set of the transmission lines and electric power is distributed to the night-time lines as shown in Fig. 1. When electric supply to said lines (*a*), (*b*) and (*c*) is stopped and the supply to the day-time lines (*c*), (*d*) and (*e*) takes place, the electro-magnet (5) is deenergized and the armature (6) moves off the electro-magnet by the spring (7) or by its own weight, so that the moving contact pieces (4) and (4′) move off the fixed contact pieces (2) and (2′) and are brought into contact with another set of the fixed contact pieces (3) and (3′), whereby the branch lines (*h*) and (*i*) are connected to the day-time lines (*d*), (*e*) and (*f*) as shown in Fig. 2. The apparatus is not limited only to the branch lines of two wire system as shown, but can equally be applied to the branch lines of three wire system.

The automatic switch to be used in the apparatus of the present invention may be suitably designed and an example of the preferable constructions is shown in Figures 3 to 5. The armature (6) pivoted at one end on a pivot (7) is arranged below the electro-magnet (5). The coil of the electro-magnet is connected to the night-time lines by leading wires (*b″*) and (*c″*). A supporting bar (8) of insulating material is horizontally fixed at its centre on the side of the core of electro-magnet (5), and at both ends of said bar metal plates (4), (4′) are attached around the bar to form a set of the fixed contact pieces. Circular holes are vertically opened at both ends of the supporting bar (8) through the contact pieces (4), (4′) as shown in Fig. 5, and circular rods (9), (9) are loosely fitted into said holes so as to slide freely up and down. The lower ends of said rods are loosely connected by means of pins (10), (10) to a bar (11) fixed at the end of the armature (6). The sides of the rods (9), (9) are cut plane at (9′), (9′) at their upper and lower parts, and metal pieces (2) (3) and (2′) (3′), forming two sets of moving contact pieces are slidably fitted on each rod at a distance larger in some degree than the depth of the fixed contact pieces (4) or (4′), and are pressed forward by springs (12), (12), so that either a set of said moving contact pieces (2) (2′) or (3) (3′) comes in contact with the fixed contact pieces (4) (4′) according to the movement of the rods (9), (9) caused by the attraction or detraction of the armature (6) to the electro-magnet (5). The fixed contact pieces (4), (4′) are connected to leading-in-wires (*h′*) (*i′*) which are to be connected to the branch lines (*h*) and (*i*). The moving contact pieces (2), (2′) and (3), (3′) are respectively connected by cords or flexible conductors (13) to terminals (14) which by turn are to be connected to the respective set of the transmission lines through leading in wires (*b′*), (*c′*) and (*e′*), (*f′*).

When electric power is supplied to the night-time lines (*a*), (*b*) and (*c*) the electro-magnet (5) of the electromagnetic switch is energized and the armature (6) is attracted as shown in full line in Fig. 3. The rods (9), (9) are elevated thereby, and those moving contact pieces (2), (2′) fitted at the lower part of said rods are brought in contact with the fixed contact pieces (4), (4′), so that electric current flowing the transmission lines (*b*) and (*c*) is distributed to the branch lines (*h*) and (*i*) through the contact pieces (2), (2′) and (4), (4′). When electric supply to the night-time lines is stopped the rods (9), (9) move downward together with the armature (6), as shown in chain lines in Fig. 3, and the moving contact pieces (3) and (3′) fitted at the upper part of said rods are brought in contact with the fixed conductors (4) (4′), so that electric current flowing the day-time lines is distributed to the branch lines.

The springs (12) arranged on the sliding rods serve for ensuring the contact between the fixed and moving contact pieces, and further the operation of the armature is rendered more active by said springs. The coil of electro-magnet is preferably connected to the night-time lines for the reason that the heating of electro-magnets are lessened by the descent of temperature at night.

I claim:—

A circuit controller including a casing, an electro-magnet suspended in the casing and embodying a yoke, an armature pivoted to swing vertically with respect to the lower end of the yoke, an insulation bar secured transversely of the yoke and provided adjacent the respective ends with openings, substantially U-shaped hooks straddled about the ends of the bar and having their side portions provided with openings aligning with the openings in the bar and constituting fixed contacts, a terminal clamp continuing from one side portion of each hook, rods slidable vertically through the aligning openings in the bar and hooks and loosely pivoted at their lower ends to the armature, and slidable and yieldingly mounted contacts on the rods adjacent the upper and lower ends thereof for alternately contacting with the upper an lower portions of the hooks which consistitute the fixed contacts, substantially as and for the purposes set forth.

In testimony whereof I have affixed my signature.

NOBUFUMI TOGAMI.